United States Patent
Fukumoto et al.

[11] Patent Number: 6,155,630
[45] Date of Patent: Dec. 5, 2000

[54] SLIDE DOOR DEVICE FOR AUTOMOTIVE VEHICLES

[75] Inventors: Ryoichi Fukumoto, Nagoya; Katsuhisa Yamada, Toyota; Masao Ohhashi, Kariya; Shintaro Suzuki, Kasugai, all of Japan

[73] Assignee: Aisin Seiki Kabushiki Kaisha, Kariya, Japan

[21] Appl. No.: 09/322,036

[22] Filed: May 28, 1999

[30] Foreign Application Priority Data

May 28, 1998 [JP] Japan .................................. 10-148159

[51] Int. Cl.[7] ............... B60J 5/06; E05F 11/02; E05F 11/54
[52] U.S. Cl. ............... 296/155; 49/352; 49/360; 49/362
[58] Field of Search ............... 296/155; 49/352, 49/360, 362

[56] References Cited

U.S. PATENT DOCUMENTS

| | | | |
|---|---|---|---|
| 3,804,454 | 4/1974 | Simmons | 292/262 |
| 3,823,279 | 7/1974 | Rausch et al. | 191/12 R |
| 3,832,967 | 9/1974 | Waner et al. | 114/144 R |
| 3,834,081 | 9/1974 | Catlett | 49/360 |
| 3,904,443 | 9/1975 | Sullivan et al. | 148/6.15 R |
| 4,553,417 | 11/1985 | Badger | 72/42 |
| 4,617,757 | 10/1986 | Kagiyama et al. | 49/280 |
| 4,640,050 | 2/1987 | Yamagishi et al. | 49/280 |
| 4,862,640 | 9/1989 | Boyko et al. | 49/213 |
| 4,903,541 | 2/1990 | Shiota | 74/501.5 R |
| 5,140,316 | 8/1992 | DeLand et al. | 296/155 |
| 5,195,393 | 3/1993 | Wolfington et al. | 74/502.5 |
| 5,316,365 | 5/1994 | Kuhlman et al. | 296/155 |
| 5,319,880 | 6/1994 | Kuhlman | 49/360 |
| 5,322,339 | 6/1994 | Dubernard | 296/155 |
| 5,645,269 | 7/1997 | Peterson | 254/398 |
| 5,724,803 | 3/1998 | Pea | 59/78.1 |
| 5,737,876 | 4/1998 | Dowling | 49/360 |
| 5,806,246 | 9/1998 | Azuma | 49/360 |
| 5,957,827 | 9/1999 | Barrus et al. | 493/413 |

FOREIGN PATENT DOCUMENTS

10-18708  1/1998  Japan .

*Primary Examiner*—D. Glenn Dayoan
*Assistant Examiner*—Hilary Gutman
*Attorney, Agent, or Firm*—Burns, Doane, Swecker & Mathis, LLP

[57] ABSTRACT

A slide door device for an automotive vehicle includes a slide door that is adapted to move between a closed position and an open position, a driving mechanism, and a cable connected between the slide door and the driving mechanism. Turning the driving mechanism on causes the cable to slide along a guide rail, thereby moving the slide door to uncover and cover the opening area in the vehicle body.

19 Claims, 10 Drawing Sheets

SLIDE DOOR DEVICE FOR AUTOMOTIVE VEHICLES

This application is based on and claims priority under 35 U.S.C. §119 with respect to Japanese Application No. 10(1998)-148159 filed on May 28, 1998, the entire content of which is incorporated herein by reference.

FIELD OF THE INVENTION

The present invention generally relates to a vehicle door. More particularly, the present invention pertains to a slide door device for an automotive vehicle that is movable between an opened position and a closed position to permit or prevent access through an opening formed in the lateral side of the vehicle-body.

BACKGROUND OF THE INVENTION

A known type of slide door device is disclosed in Japanese Patent Laid-Open Publication No. Hei 10(1998)-18708, published without examination. This slide door device includes a slide door which exposes and covers an opening area formed in the lateral side of a vehicle-body such that the slide door is moved along a center guide rail extending in the vehicle-lengthwise direction. The slide door device also includes a driving mechanism having an electric motor as a driving source and an output drum, and an endless wire cable wound on the output drum and guided through the center guide rail such that the wire extends from the rear end to the front end of the center guide rail and is turned back via a guide pulley connected to the rear end of the center guide rail so as to be connected to the slide door.

In this known slide door device, the opening and closing movement of the slide door to cover and uncover the opening area in the vehicle body is established by movements of the wire cable along the center guide rail in one direction and the other direction when the output drum is rotated by the electric motor in one direction and the other direction, respectively.

Generally speaking, the slide door is positioned at the rear side of the opening area when the slide door is in the opened condition such that the slide door is on the exterior surface of the vehicle body, and is positioned in the opening area when the sliding door is in the closed condition such that the slide door is coplanar with the exterior surface of the vehicle body. To establish such conditions of the slide door, the center guide rail is bent at its front end in the vehicle lengthwise direction toward the interior of the vehicle.

In the known slide door device, a pulley is provided at the vehicle lengthwise front end of the center guide for guiding the wire. The resulting projection of the pulley toward the interior of the vehicle becomes larger and this causes a narrowing of the interior space of the vehicle, thereby disturbing the comfort and the ease with which the passengers can get into and out of the vehicle.

In addition the guide pulley is subject to receive a force larger than the driving force applied to the wire cable while the slide door is being moved. As a result, strengthening of the support structure of the pulley to the center guide rail is required so as not to be overcome by the force. This means that the thickness of a metal plate of each element of the structure has to be increased and a reinforcing member has to be added to the support structure, and so the total weight of the slide door device is increased as are the manufacturing costs.

A need thus exists for a slide door device that is not susceptible to the same drawbacks as those mentioned above.

It would thus be desirable to provide a slide door device for an automotive vehicle which is relatively light-weight, relatively economical to manufacture, and relatively compact in size.

SUMMARY OF THE INVENTION

According to one aspect of the invention, a slide door device for an automotive vehicle includes a guide rail connected to a vehicle body and extending in the vehicle-lengthwise direction, a slide door slidably supported by the guide rail and serving to cover and uncover the opening formed in the lateral side of the vehicle body, a driving mechanism provided on the vehicle body, and a cable. One end of the cable is connected to the slide door, with the cable being slidably supported by the guide rail for moving the slide door when the cable is brought into push-pull movement by the driving mechanism. The opposite end of the cable is free from structural connection.

According to another aspect of the invention, a slide door device for an automotive vehicle includes a guide rail connected to a vehicle body and extending in a lengthwise direction of the vehicle, and a slide door on which is mounted a sliding member that is slidably supported by the guide rail for movement between an open position in which an opening in a lateral side of the vehicle body is exposed and a closed position in which the opening in the lateral side of the vehicle body is covered. A mounting bracket is rotatably mounted on the sliding member, and a driving mechanism is mounted on the vehicle body. A cable possesses one end that is connected to the rotatable mounting bracket. The driving mechanism is operatively associated with the cable to cause the cable to move in opposite directions to move the slide door between the open and closed positions.

A still further aspect of the invention involves a slide door device for an automotive vehicle that includes a guide rail connected to a vehicle body and extending in a lengthwise direction of the vehicle, and a slide door that is slidably supported by the guide rail for movement between an open position in which an opening in a lateral side of the vehicle body is exposed and a closed position in which the opening in the lateral side of the vehicle body is covered. A driving mechanism is mounted on the vehicle body, and a cable, which is operatively associated with both the driving mechanism and the slide door, is moved in opposite directions by operation of the driving mechanism. This movement causes the slide door to move between the open and closed positions. The cable includes an inner core member and a layer of molybdenum disulfide ($MoS_2$) overlying the inner core member.

BRIEF DESCRIPTION OF THE DRAWING FIGURES

The above and other features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
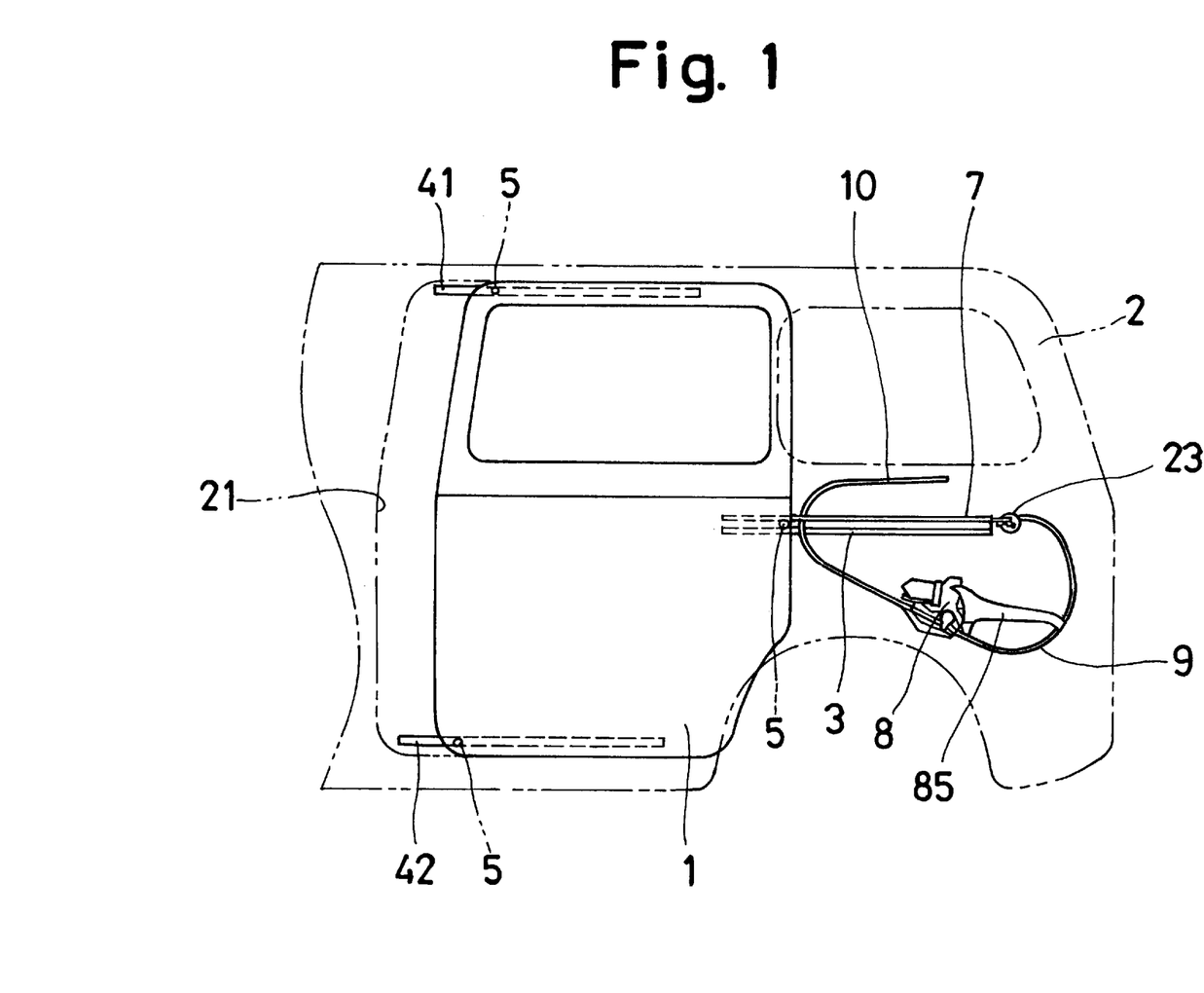
FIG. 1 is a partial vertical side view of an automotive vehicle illustrating the slide door device in accordance with the present invention.
Figure 2:
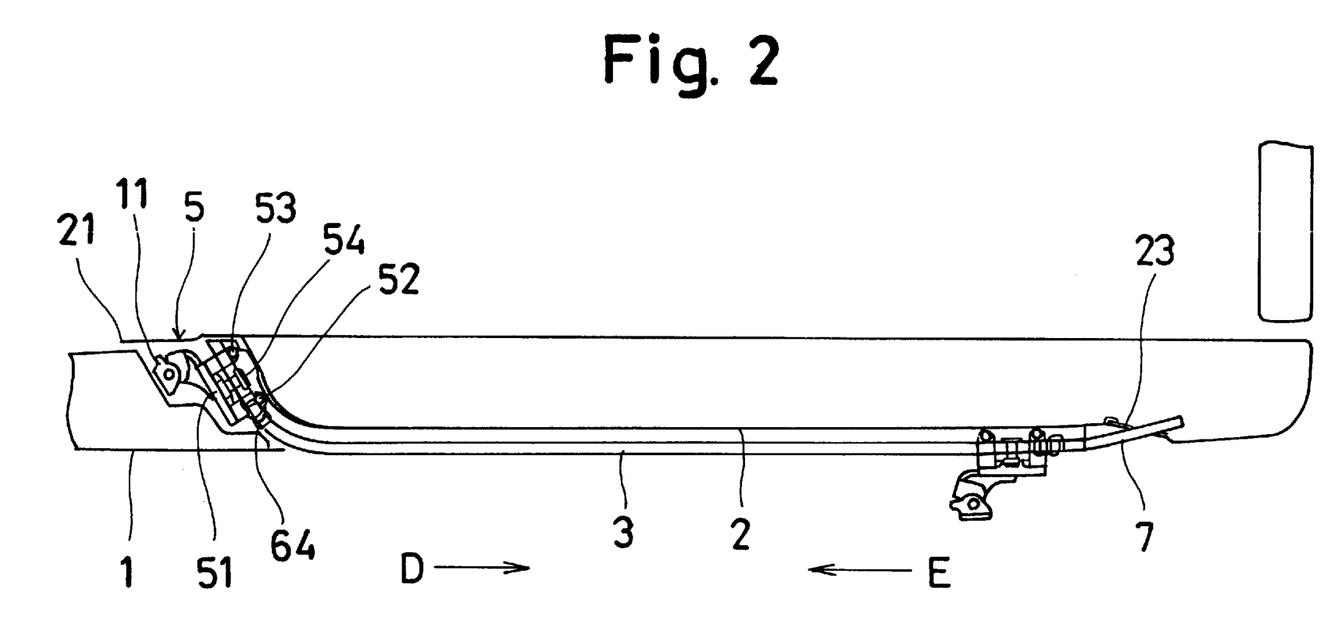
FIG. 2 is a horizontal partial side view of an automotive vehicle illustrating the slide door device in accordance with the present invention.

Referring first to FIGS. 1 and 2, a slide door 1 functions to open and close a rectangular opening area 21 formed in the lateral side of a vehicle body 2. The slide door 1 is slidably supported by a center guide rail 3 and a pair of vertically spaced rails forming upper and lower guide rails 41, 42 so as to be moved in the vehicle lengthwise or longitudinal direction corresponding to the horizontal direction in FIG. 1.

The upper guide rail 41 is secured to the vehicle body 2 by a suitable connecting device or equivalent device so that the upper guide rail 41 extends along the upper periphery of the opening area 21. The lower guide rail 42 is also secured to the vehicle body 2 by a connecting device or equivalent device so that the lower guide rail 41 extends along the lower periphery of the opening area 21. The center guide rail 3 is located between the upper and lower guide rails 41, 42, and is secured to the vehicle body 2 by a connecting device or equivalent device so that the center guide rail 3 is located at the rear side of the opening area 21 of the vehicle.

Three guide roller units 5, 5, 5 are provided at the slide door 1 and are guided by the guide rails 3, 41, 42, respectively. The slide door 1 is thus shifted from its closed position to its open position when moved in the rearward direction (i.e., towards the right in FIG. 1) and is shifted from its open position to the closed position when moved in the frontward direction (i.e. towards the left in FIG. 1). It is to be noted that the guide rails 3, 41, 42 are arranged in a parallel relationship, extend in the vehicle lengthwise direction, and are curved into the interior of the vehicle body 2 to establish a coplanar condition of the slide door 1 with the vehicle body 2 when the slide door 1 is in its closed position. When the slide door 1 is moved out of the closed condition towards the open condition, the slide door 1 moves outside the plane of the lateral side of the vehicle body 2.

The mechanism for sliding the slide door 1 between the closed and open positions will be described with reference initially to FIG. 3. The guide rail 3 is of a substantially halfway inverted U-shaped configuration having a vertical wall 31 and a pair of parallel and spaced apart upper and lower walls 32, 33 which extend outwardly from the upper and lower ends of the vertical wall 31 respectively. The upper wall 32 terminates in a downwardly directed flange wall 34 which is parallel to the vertical wall 31. A first guide pipe or guide member 7 is welded or otherwise secured to the flange wall 34 for guiding a geared cable 6. The first guide member 7 is in the form of a straight or generally linearly extending member having a downwardly facing narrow opening. It is also possible to simply make the first guide member 7 and the center guide rail 3 as an integral construction.

Figure 3:
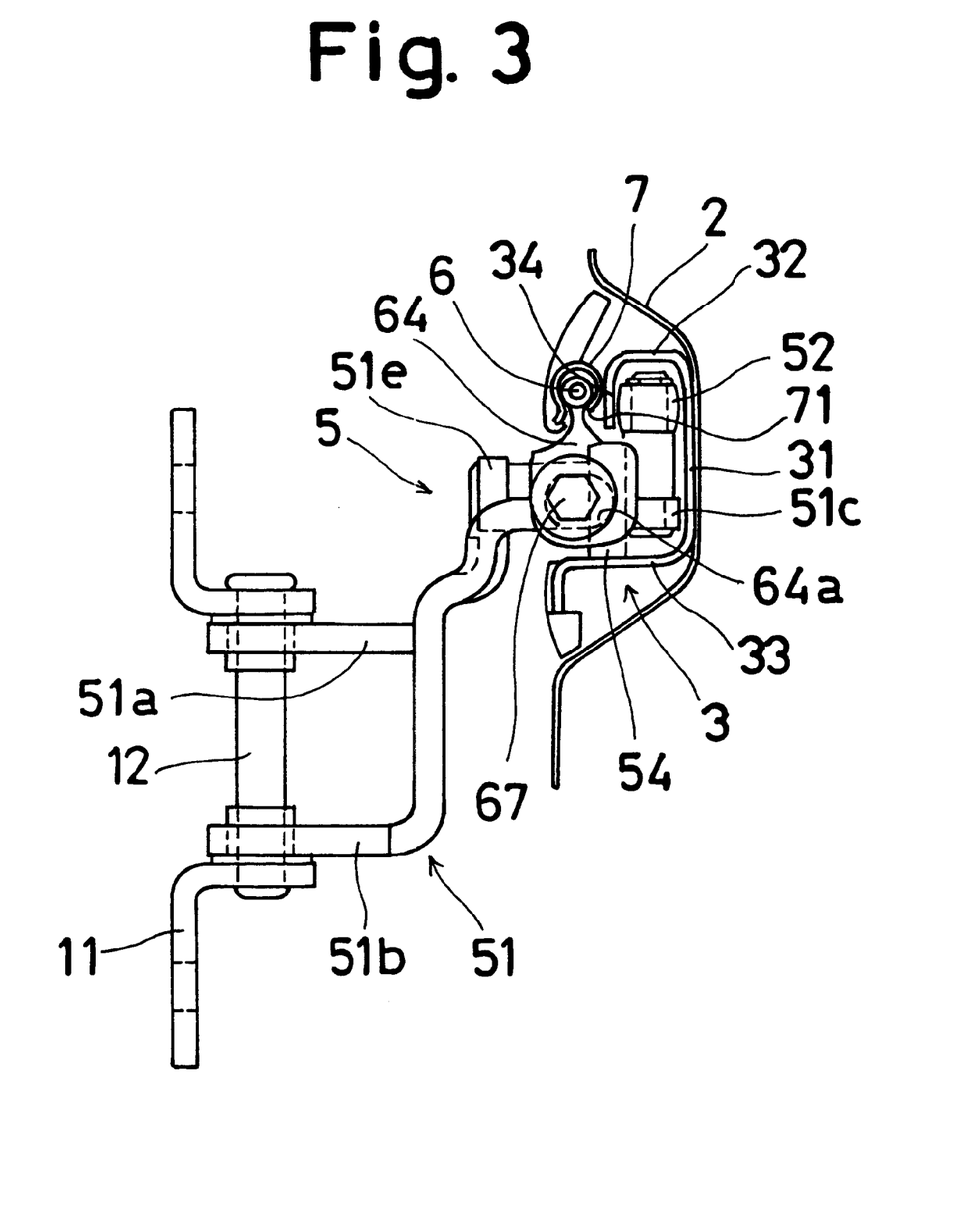
FIG. 3 is a cross-sectional view of the slide door device of the present invention illustrating the relationship between the slide member and the guide rail.
Figure 4:
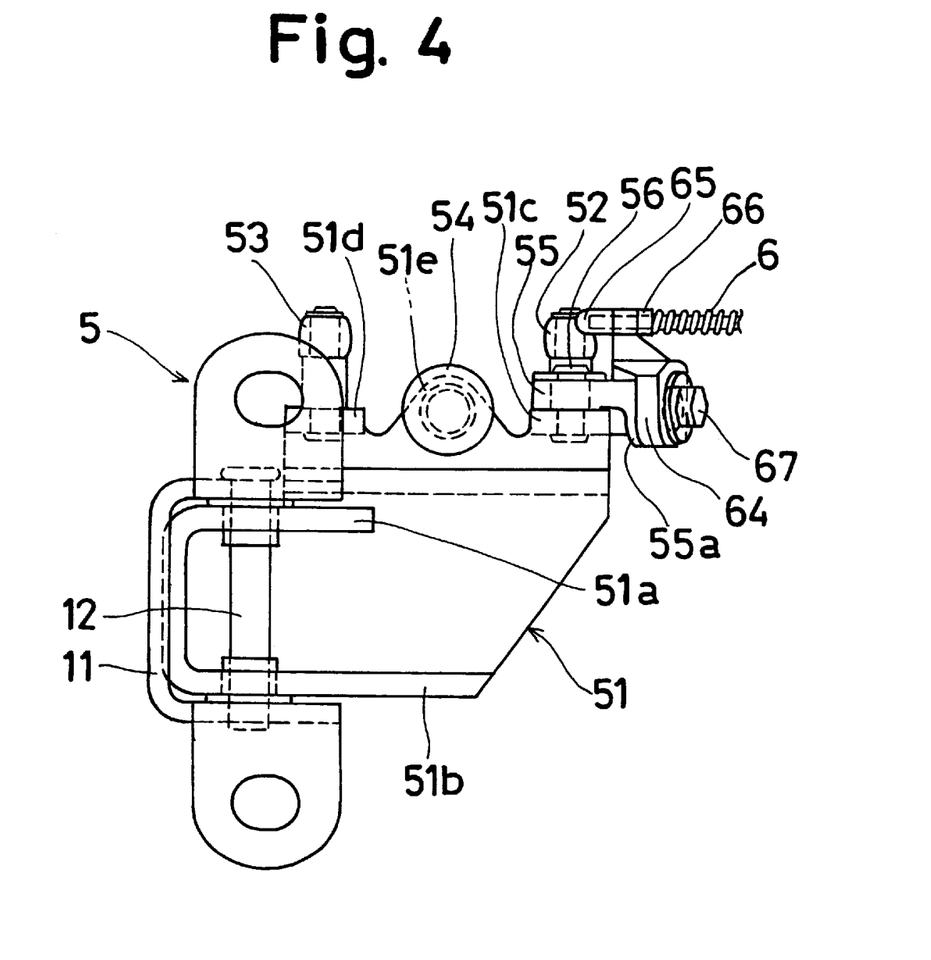
FIG. 4 is a front view of the slide member.
Figure 5:
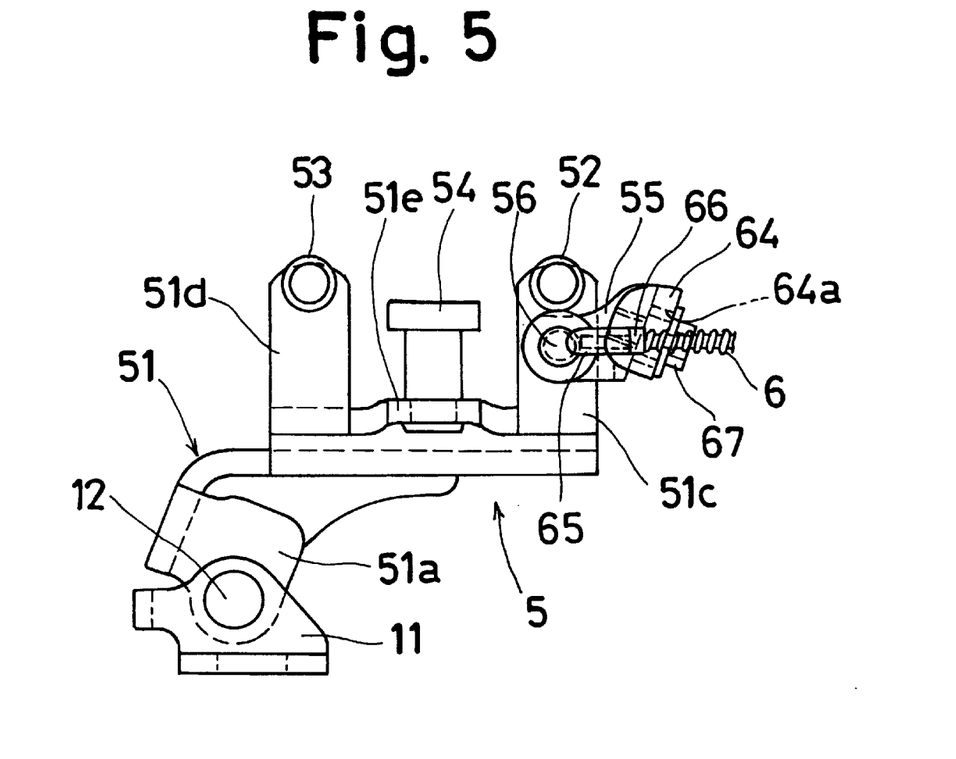
FIG. 5 is a top view of the slide member.

As shown in FIGS. 3–5, the guide roller unit 5 that is associated with the guide rail 3 is rotatably mounted or pivoted by a pin 12 to a bracket II which is secured to the slide door 1. The guide roller unit 5 includes a pair of spaced apart legs 51a, 51b, both of which are supported by the bracket 11, a pair of horizontal flanges 51c, 51d, and a vertical flange 51e extending upwardly between the horizontal flanges 51c, 51d. The guide roller unit 5 also includes an inner-outer roller pair 52, 53 and an upper-lower roller 54. The first inner-outer roller 52 is rotatably mounted or supported by the horizontal flange 51c while the second inner-outer roller 53 is rotatably mounted or supported by the horizontal flange 51d. The upper-lower roller 54 is rotatably supported by the vertical flange 51e.

The pair of inner-outer rollers 52, 53 is accommodated within the center guide rail 3, with the inner-outer rollers 52, 53 being in sliding contact with both the flange wall 34 and the vertical wall 31 as shown in FIG. 3. The upper-lower roller 54 is accommodated within the center guide rail 3 and is in sliding contact with the lower wall 33 of the guide rail 3. Thus, the guide roller unit 5 is movably held by the center guide rail 3 without excessive play in either the vertical direction or the horizontal direction (i.e., the vehicle interior-and-exterior direction). It is to be noted that other guide roller units 5, 5 that are operatively associated with the upper and lower rails 41, 42 are of similar structure for establishing a similar smooth movement of the slide door 1 without excessive play.

A supporting bracket 55 is pivoted to the horizontal flange 51c of the bracket 51 of the guide roller unit 5 at a pin 56. The supporting bracket 55 has at its distal end a downward bent flange portion 55a. This supporting bracket 55 can be supported co-axially with the rotational axis of the first inner-outer roller 52.

Figure 6:
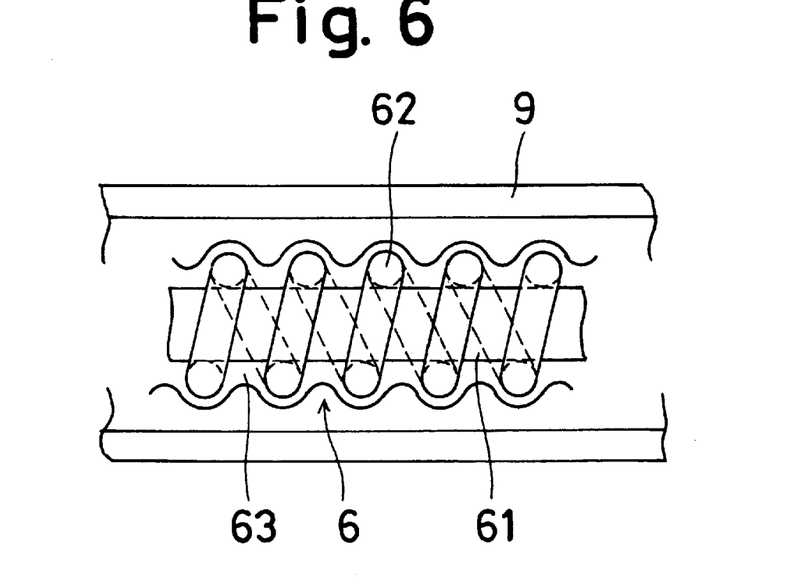
FIG. 6 is a cross-sectional view of the geared cable.

FIG. 6 illustrates the geared cable 6 which is to be guided along the first guide member 7 as mentioned above. The geared cable 6 includes a core 61 and a continuous metal wire 62 wound spirally around the core 61. A layer 63 of molybdenum disulfide ($MoS_2$) is baked on or disposed around the core 61 and the metal wire 62 to establish a connection between the core 61 and the metal wire 62.

As seen in FIGS. 3 and 5, a mounting bracket 64 is rotatably mounted on one end portion of the geared cable 6 so that the bracket 64 is restricted from moving along the geared cable 6 by a pair of stoppers 65, 66, both of which are clamped on the cable 6. The mounting bracket 64 extends in the downward direction and opposes the flange portion 55a of the supporting bracket 55. The bracket 64 terminates at a distal end portion having a slot 64a extending along the vehicle lateral direction. The mounting bracket 64 is connected or bolted to the flange portion 55a of the supporting bracket 55 by a stepped bolt 67 that passes through the slot 64a. The supporting bracket is thus rotatable about an axis that is at a right angle to the axis of the cable 6. It is to be noted that the opposite end of the geared cable 6 (i.e., the end of the geared cable 6 that is located opposite the end that is connected to the mounting bracket 64) is free and is not connected to any member.

Figure 7:
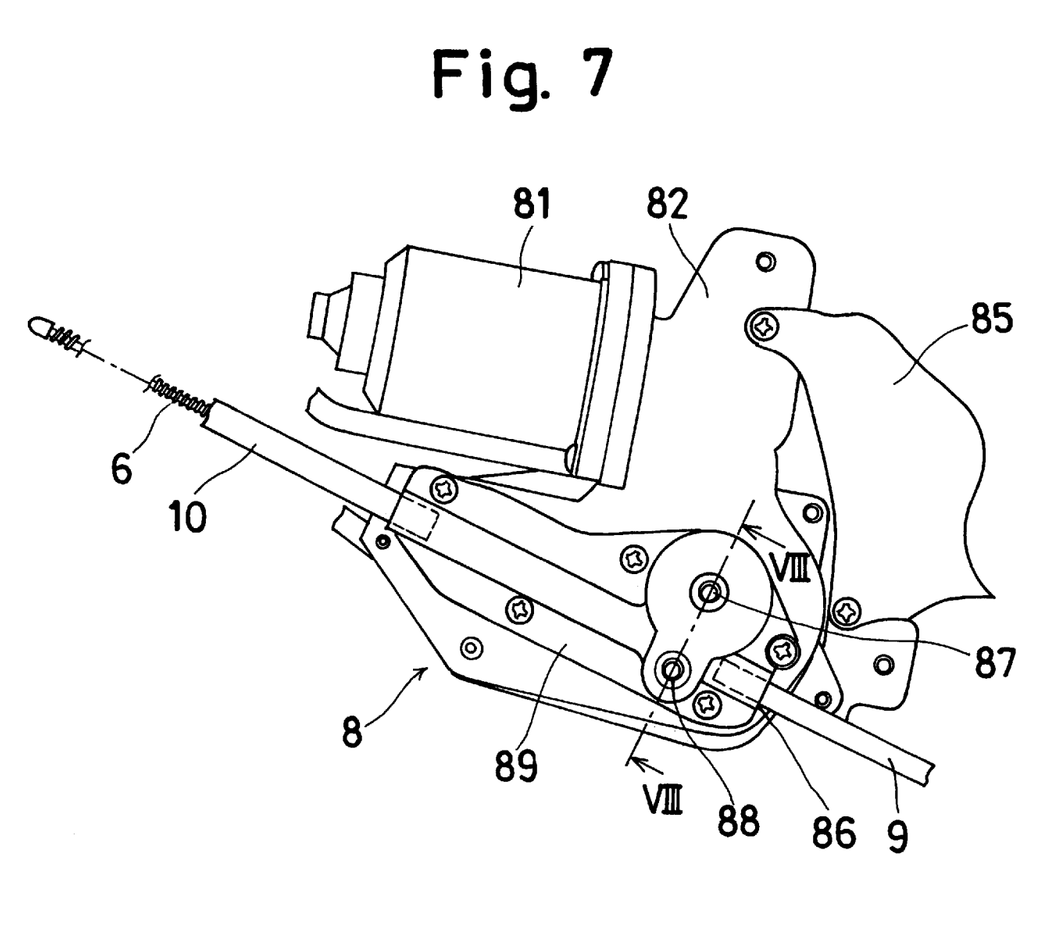
FIG. 7 is a front view of the driving device.
Figure 8:
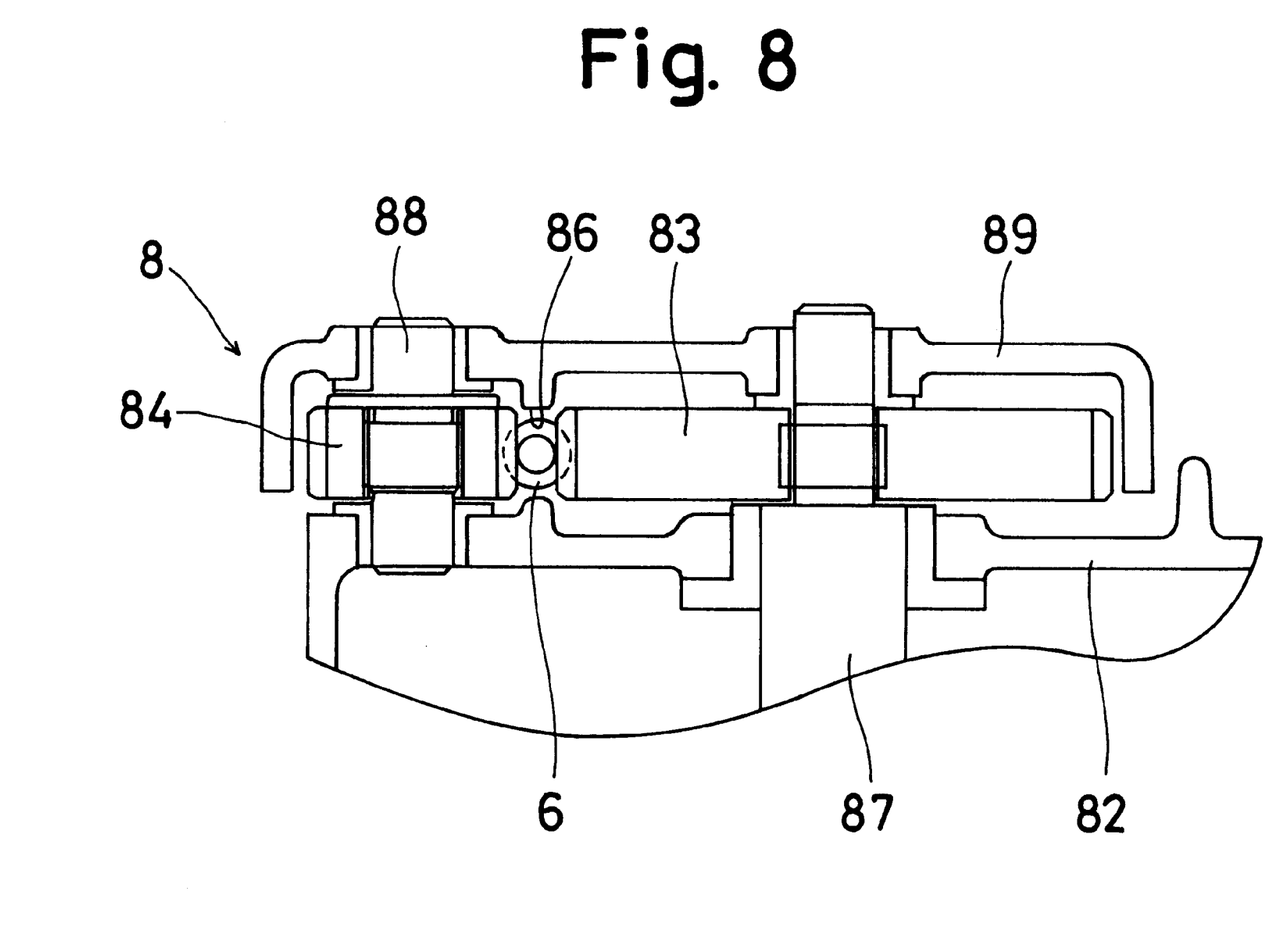
FIG. 8 is a cross-sectional view taken along the section line VIII—VIII in FIG. 7.

As can be seen from FIG. 1, at the rearward portion of the opening area 21 in the lateral side of the vehicle, a driving mechanism 8 is fixed to the interior surface of the lateral side of the vehicle body 2. The driving mechanism 8, which is shown in FIGS. 7 and 8 includes an electric motor 81 serving as a power source. An output shaft 87 is connected to the motor 81 via a speed reduction gear train that is accommodated in a housing 82 of the motor 81. An output gear 83 is supported on the output shaft 87 outside the housing 82. A driven gear 84 is pivoted by a pin 88 to the housing 82 in opposing relation to the output gear 83. The output gear 83 and the driven gear 84 are covered with a cover member 89 secured to the housing 82. Between the output gear 83 and the driven gear 84, the cover 89 and the housing 82 cooperate to constitute a guide passage 86 for guiding the geared cable 6 in the vehicle lengthwise direction.

As can be seen from FIG. 1, at the rearward portion of the opening area 21, a second guide pipe or guide member 9 is fixed to the interior surface of the lateral side of the vehicle body 2 via a bracket 85. The second guide member 9 is formed or bent into an arc-shaped configuration. One end of the second guide member 9 is connected to the rear end of the center guide rail 3 (i.e., the end of the guide rail 3 located towards the rear of the vehicle) after passing through an aperture 22, shown in FIG. 10, that is formed in the vehicle body 2 and located near the vehicle-rear end of the center guide rail 3 as can be seen from FIG. 11. As can be seen from FIG.7, the other end of the second guide member 9 is connected to the housing 82 by being snugly fitted into the guide passage 86.

Figure 9:
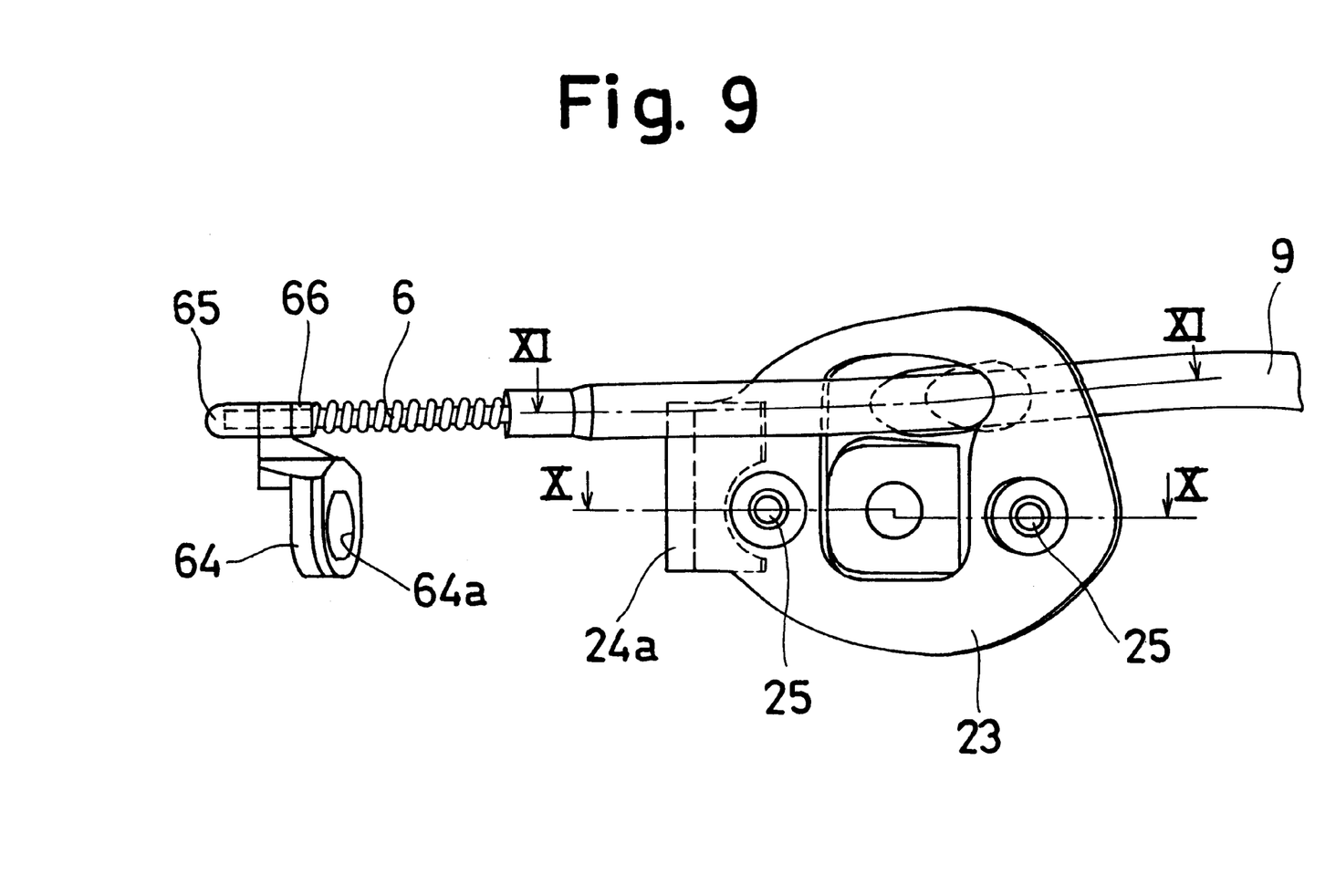
FIG. 9 is a front view of the sealing bracket.
Figure 10:
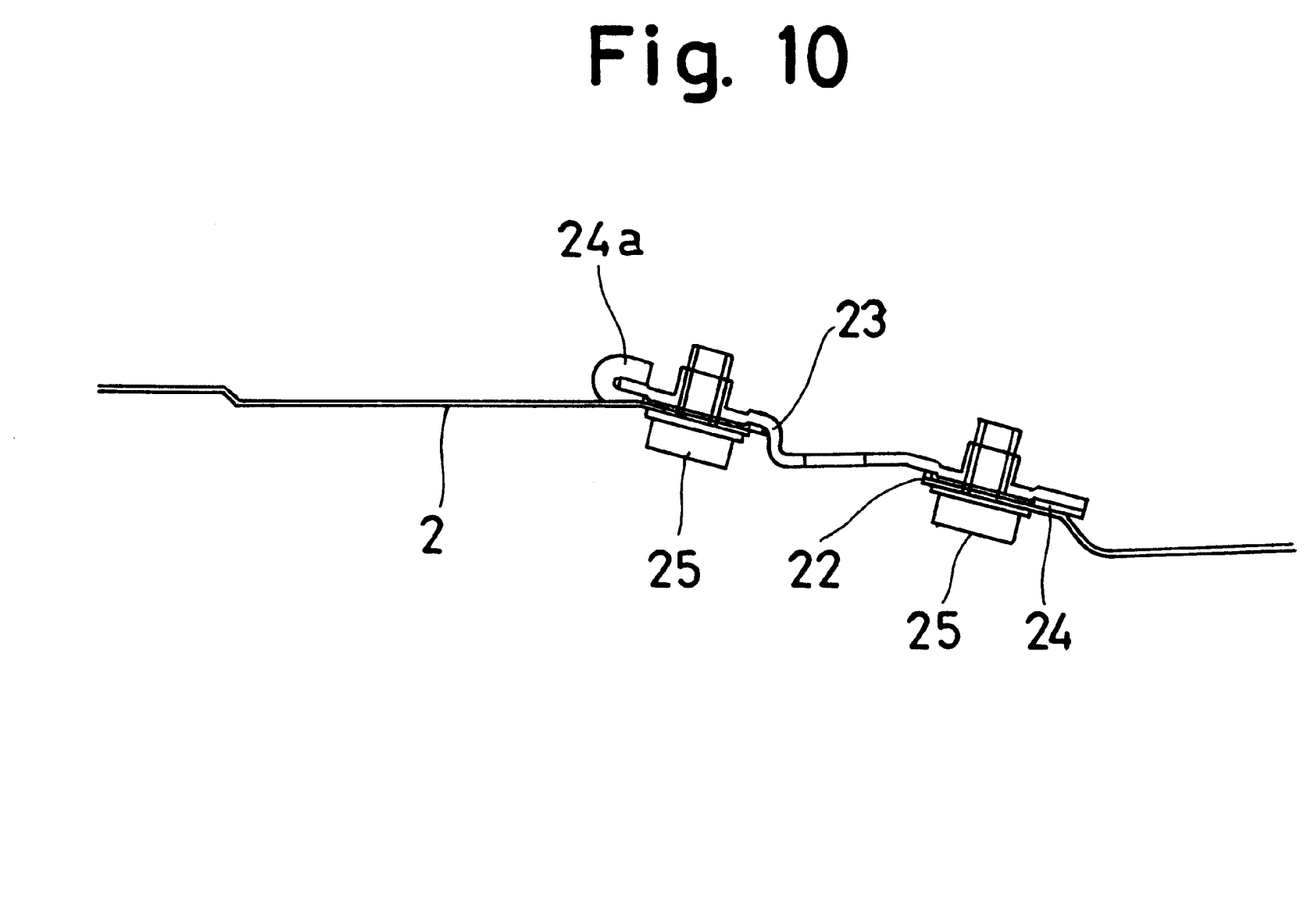
FIG. 10 is a cross-sectional view taken along the section line X—X in FIG. 9.
Figure 11:
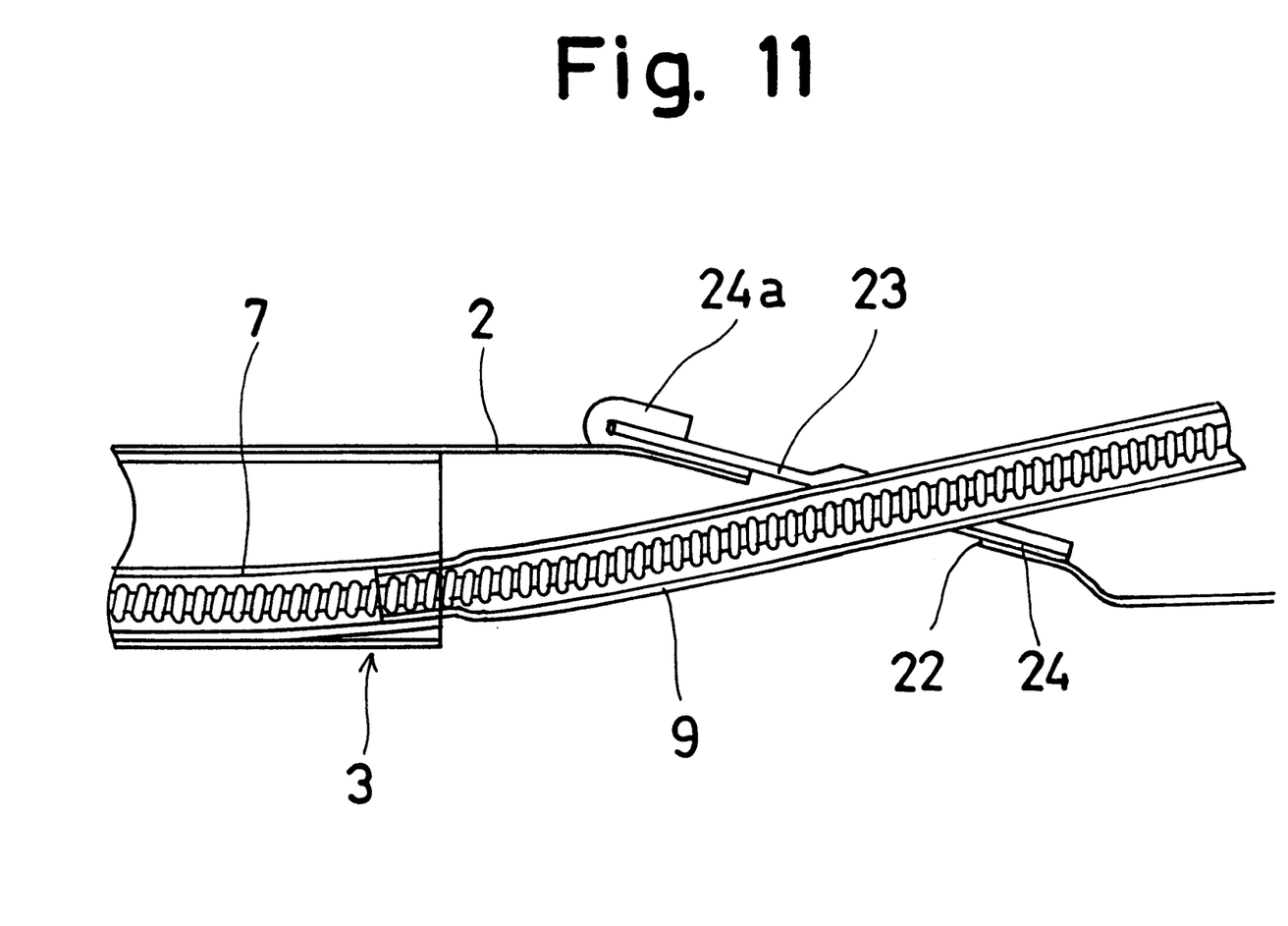
FIG. 11 is a cross-sectional view taken along the section line XI—XI in FIG. 9.

As shown in FIGS. 9–11, a sealing bracket 23 is fixed by several bolts 25 to the interior surface of the lateral side of the vehicle body 2 and covers the aperture 22 in the lateral side of the vehicle body 2. The sealing bracket 23 supports the second guide member 9. A sealing member 24 is positioned and held between the sealing bracket 23 and the vehicle body 2 to assure a fluid-tight condition around the second guide member 9. The sealing member 24 can be fixed or connected to the sealing bracket 23. To prevent possible separation of the sealing member 24 from the sealing bracket 23 during assembly, the sealing member 24 is provided with a turned-over portion 24*a* which covers an edge of the sealing bracket 23 as seen in FIG. 10.

As shown in FIG. 1, at the rearward portion of the opening area 21 in the lateral side of the vehicle, one end of a third guide pipe or guide member 10 is fixed to the interior surface of the lateral side of the vehicle body 2. As shown in FIG.7, the other end of the third guide member 10 is fixed to the housing 82 by being snugly fitted in the guide passage 86 at the end of the guide passage 86 that is closer to the front side of the vehicle.

The geared cable 6 is slidably guided along the first guide 7, is guided into the driving mechanism 8 by the second guide member 9 in a slidable manner, and thereafter advances to the third guide member 10 so as to be guided slidably. Thus, while being guided through the guide passage 86 in the housing 82, the geared cable 6 is in meshing engagement with each of the output gear 83 and the driven gear 84 of the driving mechanism 8. The meshing engagement between the geared cable 6 and each of the output gear 83 and the driven gear 84 of the driving mechanism 8 is established in a rather smooth manner without excessive play due to the layer 63 of molybdenum disulfide (MoS$_2$) on the outer surface of the cable 6.

In operation, when the opening area 21 in the lateral side of the vehicle is closed, turning on or driving the motor 81 in one direction rotates the output gear 83, thereby pulling the geared cable 6. This results in sliding movement of the geared cable 6 through the guide passage 86, the first guide member 7, the second guide member 9, and the third guide member 10. During this movement of the geared cable 6, a reaction force caused by the engagement between the geared cable 6 and the output gear 83 is received or supported by the driven gear 84 which is also in meshing engagement with the geared cable 6 at the opposite position of the output gear 83. Due to the fact that the driven gear 84 continues to rotate as long as the geared cable 6 moves, such a reception of the reaction force by the driven gear 84 fails to prevent or disturb an expected movement of the geared cable 6, thereby assuring smooth movement of the geared cable 6. In addition, the layer 63 of molybdenum disulfide (MoS$_2$) on the outer surface of the cable 6 reduces sliding friction between the geared cable 6 and each of the guide passage 86, the first guide member 7, the second guide member 9, and the third guide member 10, thereby assuring smooth movement of the geared cable 3 and preventing noise generation.

Pulling the geared cable 6 causes movement of the slide door 1 in the direction D in FIG. 2 along the center guide rail 3 via the brackets 64, 55. This movement of the slide door 1 causes the slide door to move towards the open position to expose the opening area 21 in the lateral side of the vehicle. When the guide roller unit 5 passes through the bent portion of the center guide rail 3, the resulting or inevitable stroke difference of the guide roller unit 5 in the vertical direction and the vehicle lateral direction can be absorbed by the existence of the slot in the bracket 64 and the rotatable nature of the brackets 55, 64.

Covering the opening area 21 in the lateral side of the vehicle can be achieved by turning on the motor 81 in the opposite direction, thus causing movement of the geared cable 6 in the direction E shown in FIG. 2.

According to the present invention, the slide door 1 is brought into sliding movement by moving the geared cable which is guided along the guide rail. This eliminates the guide pulley used in other known devices which was essential for the arrangement of the cable. This results in a more compact overall device, thereby lessening the degree of projection of the guide rail toward the interior space of the vehicle body. This improves the comfort of the passenger(s) in the vehicle. In addition, no supporting mechanism for the guide pulley is required which reduces the production cost and the total weight of the slide door device. This also reduces the number of parts in the device. Moreover, connecting the driving mechanism and the slide door by the geared cable enables an improved flexible arrangement of the driving mechanism within the vehicle body.

Also in accordance with the present invention, the guide rail for guiding the geared cable in a slidable manner is positioned at the outer or exterior side of the vehicle body so as to be at the rear side of the opening area. This enables an arrangement of the driving mechanism within the vehicle body at a position other than at the lower portion of the opening area. This thus allows the lower side of the opening area to be lowered so that passengers can get into and out of the vehicle more easily.

In the slide door device of the present invention, the slide member is slidably supported by the guide rail and is connected to the slide door, the mounting bracket is connected to one end of the cable so as to be rotatable about the axis of the cable, the supporting bracket is rotatably mounted with respect to the slide member so as to be rotatable about an axis which is oriented substantially at right angles relative to the axis of the cable, and the mounting bracket is supported such that the mounting bracket is movable along its axis. Such a structure or arrangement absorbs a differential locus of the slide member during movement of the slide member, thereby ensuring smooth movements of the geared cable without any twist or other similar deformation. In addition, the tension in the geared cable is directed only along the axial direction of the cable, whereby the slide member is prevented from being urged onto the guide rail and the geared cable is prevented from being brought into interference with the guide rail. Thus, the frictional wear of both the slide member and the geared cable can be prevented and so a long range assurance of stable movements of the slide door can be established.

By virtue of the present invention, the geared cable is in meshing engagement with both the output gear that is coupled to the motor and the driven gear that is opposed to the output gear. During the movement of the geared cable, a reaction force caused by the engagement between the geared cable and the output gear is received or supported by the driven gear which is also in meshing engagement with the geared cable. Due to the fact that the driven gear continues to rotate as long as the geared cable moves, the reception of the reaction force by the driven gear does not prevent or disturb an expected movement of the geared cable, thereby ensuring smooth movement of the geared cable.

The present invention is also advantageous in that a cover (e.g., a baked layer) of molybdenum disulfide ($MoS_2$) is provided on the outer surface of the geared cable which is in meshing engagement with the output gear. Due to the fact that the baked layer of molybdenum disulfide ($MoS_2$) possesses elasticity and is self lubricating, the gap between the geared cable and the output gear can be minimized and the sliding friction between the geared cable and the output gear is reduced as small as possible. Thus, the generation of noise is prevented and the movement of the geared cable can be moved in a smooth and effective manner.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A slide door device for an automotive vehicle comprising:
   a guide rail connected to a vehicle body and extending in a lengthwise direction of the vehicle;
   a slide door slidably supported by the guide rail for covering and uncovering an opening area formed in a lateral side of the vehicle body;
   a driving mechanism provided on the vehicle body; and
   a cable having on end connected to the slide door and an opposite free end, the cable being slidably supported by the guide rail for moving the slide door when the cable is moved by the driving mechanism.

2. A slide door device as set forth in claim 1, wherein the guide rail is positioned on an exterior surface of the vehicle body at a rear side of the opening area with respect to the lengthwise direction of the vehicle.

3. A slide door device as set forth in claim 2, further comprising a guide member connected between the driving mechanism and a rear end of the guide rail for slidably guiding the cable, the rear end of the guide member being provided with an opening through which extends the cable, a sealing bracket secured to an interior of the vehicle body, and a sealing member mounted on the sealing bracket for sealing the opening in the guide member.

4. A slide door device as set forth in claim 1, including a slide member slidably supported by the guide rail and connected to the slide door, a mounting bracket connected to the one end of the cable and rotatable about an axis of the cable, and a supporting bracket rotatably mounted on the slide member for rotatable movement about an axis substantially forming a right angle relative to the axis of the cable, the supporting bracket supporting the mounting bracket such that the mounting bracket is movable along its axis.

5. A slide door device as set forth in claim 1, wherein the driving mechanism includes a motor, an output gear coupled to the motor and in meshing engagement with the cable, and a driven gear opposed to the output gear and in meshing engagement with the cable.

6. A slide door device as set forth in claim 1, wherein the cable includes a core and a metal wire wound spirally around an outer surface of the core for establishing a geared configuration, and a layer of molybdenum disulfide ($MoS_2$) being provided on the core and metal wire.

7. A slide door device for an automotive vehicle comprising:
   a guide rail connected to a vehicle body and extending in a lengthwise direction of the vehicle;
   a slide door on which is mounted a sliding member that is slidably supported by the guide rail for movement between an open position in which an opening in a lateral side of the vehicle body is exposed and a closed position in which the opening in the lateral side of the vehicle body is covered;
   a mounting bracket rotatably mounted on the sliding member;
   a driving mechanism mounted on the vehicle body;
   a cable having one end connected to the rotatable mounting bracket, said driving mechanism being operatively associated with the cable to cause the cable to move in opposite directions to move the slide door between the open and closed positions;
   a guide member extending between the driving mechanism and a rear end of the guide rail and through which the cable extends, the guide member possessing a rear end provided with an opening through which extends the cable; and
   a supporting bracket rotatably mounted on the slide member for rotatable movement about an axis substantially forming a right angle relative to the axis of the cable.

8. A slide door device as set forth in claim 7, wherein the guide rail is positioned on an exterior surface of the vehicle body at a rear side of the opening with respect to the lengthwise direction of the vehicle.

9. A slide door device as set forth in claim 7, including a supporting bracket rotatably mounted on the slide member for rotatable movement about an axis substantially forming a right angle relative to the axis of the cable.

10. A slide door device as set forth in claim 7, wherein the cable includes a core and a metal wire wound spirally around an outer surface of the core for establishing a geared configuration, and a layer of molybdenum disulfide ($MoS_2$) provided on the metal wire and core.

11. A slide door device as set forth in claim 7, wherein an end of the cable opposite said first end is free of connection with any structure.

12. A slide door device for an automotive vehicle comprising:
   a guide rail connected to a vehicle body and extending in a lengthwise direction of the vehicle, a slide door on which is mounted a sliding member that is slidably supported by the guide rail for movement between an open position in which an opening in a lateral side of the vehicle body is exposed and a closed position in which the opening in the lateral side of the vehicle body is covered;

a mounting bracket rotatably mounted on the sliding member;

a driving mechanism mounted on the vehicle body; and a cable having one end connected to the rotatable mounting bracket, said driving mechanism being operatively associated with the cable to cause the cable to move in opposite directions to move the slide door between the open and closed positions;

the driving mechanism including a motor, an output gear coupled to the motor and in meshing engagement with the cable, and a driven gear opposed to the output gear and in meshing engagement with the cable.

13. A slide door device as set forth in claim 12, including a guide member extending between the driving mechanism and a rear end of the guide rail and through which the cable extends.

14. A slide door device as set forth in claim 13, wherein the guide member possesses a rear end provided with an opening through which extends the cable.

15. A slide door device as set forth in claim 14, including a sealing bracket secured to an interior of the vehicle body, and a sealing member mounted on the sealing bracket for sealing the opening in the guide member.

16. A slide door device for an automotive vehicle comprising:

a guide rail connected to a vehicle body and extending in a lengthwise direction of the vehicle;

a slide door that is slidably supported by the guide rail for movement between an open position in which an opening in a lateral side of the vehicle body is exposed and a closed position in which the opening in the lateral side of the vehicle body is covered;

a driving mechanism mounted on the vehicle body; and a cable that is operatively associated with the driving mechanism and the slide door for being moved in opposite directions by operation of the driving mechanism to move the slide door between the open and closed positions, said cable including a core, a metal wire wound spirally around an outer surface of the core to form a geared configuration, and a layer of molybdenum disulfide ($MoS_2$) overlying the core.

17. A slide door device as set forth in claim 16, wherein one end of the cable is connected to a mounting bracket, said mounting bracket being rotatably mounting on a slide member that is secured to the slide door.

18. A slide door device as set forth in claim 16, wherein the guide rail is positioned on an exterior surface of the vehicle body at a rear side of the opening area with respect to the lengthwise direction of the vehicle.

19. A slide door device as set forth in claim 16, including a first guide member provided in the guide rail, a second guide member extending between the first guide member and the driving mechanism, and a third guide member extending away from the driving mechanism, said cable extending into the first, second and third guide members as the slide door is moved between the closed position and the open position.

\* \* \* \* \*